Patented Nov. 3, 1925.

1,559,899

UNITED STATES PATENT OFFICE.

OTTO LOWY, OF NEWARK, NEW JERSEY, ASSIGNOR, BY MESNE ASSIGNMENTS, TO TECHNICAL PRODUCTS CORPORATION, A CORPORATION OF NEW JERSEY.

PROPHYLACTIC AND METHOD OF MAKING THE SAME.

No Drawing. Application filed December 20, 1920. Serial No. 432,082.

*To all whom it may concern:*

Be it known that I, OTTO LOWY, a citizen of the United States, and a resident of the city of Newark, Essex County, State of New Jersey, have invented an Improvement in Prophylactics and Methods of Making the Same, of which the following is a specification.

My invention relates to prophylactics and to methods of producing the same. It is an object of the present invention to provide a prophylactic which will be particularly beneficial in the prevention of such diseases as syphilis and the like by providing substances which will be easy and economical to manufacture, which shall possess to an unusually high degree the necessary prophylactic properties, and which are in such a form as to render the same very convenient and efficient in application.

By way of example, I shall, in the accompanying specification, set forth illustrative embodiments of the product and process of my invention, it being, however, clearly understood that my invention is not to be limited to such illustrative embodiments herein set forth by way of example merely.

Referring to such illustrative embodiments, I may prepare one form of the prophylactic of my invention substantially in accordance with the following illustrative form of the process of my invention:

I first take an arseno-benzol derivative, preferably arsphenamine or the dihydrochloride of diamino-dihydroxy-arseno-benzol, or a solution or other form of the di-sodium salt of diamino-dioxy-arseno-benzol, such for example as the solution disclosed in my co-pending application, Serial No. 432,081, filed December 20, 1920, especially where the latter substance has become contaminated or has otherwise been spoiled so that it is no longer suitable for intravenous injection.

If a solution of the di-sodium salt of diamino-dioxy-arseno-benzol is employed, I precipitate the base in the form of diamino-dihydroxy-arseno-benzol by adding a sufficient amount of hydrochloric acid to the solution. The precipitated base of arsphenamine, for example, where only enough hydrochloric acid has been added to neutralize the sodium of the di-sodium salt, is then collected either on a filter paper, using a Buchner funnel, or on an alundum filter, or by means of a centrifuge.

The base or the dihydrochloride, as the case may be, is now dissolved in methyl alcohol preferably containing about 1 c.c. of hydrochloric acid per 100 c.c. of methyl alcohol. The concentration of this solution is not of determining importance and may vary within considerable limits. The methyl alcohol solution thus formed is now acidulated with hydrochloric acid, preferably by adding about 6 c.c. of hydrochloric acid to each gram of arsphenamine, or of the base, used.

There is then added about 44 c.c. of a 10% solution of bichloride of mercury in methyl alcohol per each gram of arsphenamine or its base employed. The mercury precipitate, which we shall call "mercuriated" arseno-benzol or "mercuriated" arsphenamine, as the case may be, is allowed to settle and is then washed with ether and the supernatant liquid poured off, leaving an almost dry, yellow, powdery precipitate.

In view of the apparently complex nature of this precipitate, I shall not presume at the present time to attempt to indicate its structural or other formula. This precipitate is then thoroughly mixed with about 240 grams of glycerine per gram of arsphenamine or its equivalent employed.

There is now prepared an amount of a carrier, preferably in the form of a gelatin solution, in such a proportion that the final product will be of a firm gelatinous consistency at ordinary temperatures but will be substantially fluid at body temperature. This carrier should also have the property of not adversely affecting, or of being adversely affected by, the "mercuriated" precipitate already described. It is also to be noted that glycerine likewise does not adversely affect, and is not adversely affected by, the "mercuriated" precipitate referred to above.

There is now prepared an aqueous solution of bichloride of mercury in sufficient quantity so that when the "mercuriated" precipitate and glycerine have been mixed with the gelatin in about the proportions above set forth, the amount of bichloride present will bring the bichloride content up to about one thousand.

The warm gelatin suspension thus formed is allowed to cool and, before gelatinizing, is filled into the desired containers.

In its final form, the above described embodiment of the prophylactic of my invention, as made by the above described embodiment of the process of my invention, will be found to be highly efficient in the prevention of the diseases for the prophylaxis of which it is particularly intended to be used. It will also be very easy to apply and very efficient in use, due to its form, in which form it is of a firm gelatinous consistency at ordinary temperatures but substantially fluid at body temperature. The presence of the gelatin and the glycerine, particularly the latter, without any deleterious effect on the "mercuriated" precipitate, and without any deleterious effect of the latter on the gelatin or glycerine, results in a very superior and desirable product which is admirably suited for the purpose for which it is intended.

It is, of course, to be noted that my invention is not limited to the specific embodiments thereof herein described for purposes of illustration only.

What I claim is:

1. A prophylactic comprising the precipitate resulting from adding mercuric chloride to the dihydrochloride of diamino-dihydroxy-arseno-benzol in a carrier of a firm, gelatinous consistency at ordinary temperatures but substantially fluid at body temperature.

2. A prophylactic comprising a "mercuriated" derivative of arseno-benzol in a carrier of a firm, gelatinous consistency at ordinary temperatures but substantially fluid at body temperature.

3. A prophylactic containing "mercuriated" arsphenamine in a carrier of a gelatinous consistency at ordinary temperatures but substantially fluid at body temperature.

4. A prophylactic comprising a "mercuriated" derivative of arseno-benzol in a carrier of gelatin.

5. A prophylactic containing "mercuriated" arsphenamine in a carrier of gelatin.

6. A prophylactic comprising the precipitate resulting from adding mercuric chloride to the dihydrochloride of diamino-dihydroxy-arseno-benzol in a carrier containing mercuric chloride and being of a firm gelatinous consistency at ordinary temperatures but substantially fluid at body temperature.

7. A prophylactic comprising the precipitate resulting from adding mercuric chloride to the dihydrochloride of diamino-dihydroxy-arseno-benzol in a carrier containing mercuric chloride together with glycerine and being of a firm gelatinous consistency at ordinary temperatures but substantially fluid at body temperature.

8. An arsphenamine compound formed by adding mercuric chloride to a solution of arseno-benzol derivative containing a substantial amount of free hydrochloric acid.

9. An arsphenamine compound formed by adding mercuric chloride to a methyl alcohol solution of arsphenamine containing a substantial amount of free hydrochloric acid.

10. An arsphenamine compound formed by adding mercuric chloride to a methyl alcohol solution of arsphenamine containing a substantial amount of free hydrochloric acid, collecting the precipitate thus formed, and mixing the same intimately with glycerine.

11. The method which comprises the step of adding mercuric chloride to a methyl alcohol solution of arsphenamine containing a substantial amount of free hydrochloric acid, collecting the precipitate thus formed, mixing the same intimately with glycerine, and thereafter incorporating the mixture thus formed in a carrier in such proportions that the resulting product will be of a firm gelatinous consistency at ordinary temperatures but substantially fluid at body temperature.

12. The method which comprises the step of adding mercuric chloride to a methyl alcohol solution of arsphenamine containing a substantial amount of free hydrochloric acid, collecting the precipitate thus formed, mixing the same intimately with glycerine, and thereafter incorporating the mixture thus formed in gelatin in such proportions that the resulting product will be of a gelatinous consistency at ordinary temperatures but substantially fluid at body temperature.

In testimony whereof, I have signed my name to this specification this 17th day of December, 1920.

OTTO LOWY.